United States Patent

[11] 3,548,109

[72] Inventor Josef Schnurr
Munich, Germany
[21] Appl. No. 668,345
[22] Filed Sept. 18, 1967
[45] Patented Dec. 15, 1970
[73] Assignee Siemens Aktiengesellschaft
Berlin and Munich, Germany
[32] Priority Sept. 19, 1966
[33] Germany
[31] No. S105932

[54] TELEPHONE RELAY AND ASSOCIATED CIRCUIT
2 Claims, 2 Drawing Figs.

[52] U.S. Cl. .......... 179/16
[51] Int. Cl. .......... H04m 19/00
[50] Field of Search .......... 179/16.09, 16.4, 18.7, 172, 173; 335/154; 336/217

[56] References Cited

UNITED STATES PATENTS

| | | | |
|---|---|---|---|
| 2,350,589 | 6/1944 | Christian | 179/16 |
| 2,424,452 | 7/1947 | Gillings et al. | 179/16 |
| 2,709,721 | 5/1955 | Ganitta | 179/16(.4) |
| 2,964,836 | 12/1960 | Smith | 336/217 |
| 3,302,143 | 1/1967 | Harkenrider | 335/154 |

*Primary Examiner*—Kathleen H. Claffy
*Assistant Examiner*—Jan S. Black
*Attorney*—Birch, Swindler, McKie & Beckett

ABSTRACT: A relay structure and corresponding relay circuit for use in a voice telephone communication system wherein evaluation means are responsive to interruptions in transmission line loop current, but not to alternating current signals present in the transmission line. The evaluation means comprise a relay structure which functions as a choke coil to block alternating current signals. However, interruptions in the line loop current are evaluated by the relay structure to effect desired associated relay contact actuation correctly indicative of transmission line loop current interruption, without having to use capacitor and rectifier elements in the relay circuit to ensure accuracy.

TELEPHONE RELAY AND ASSOCIATED CIRCUIT

BACKGROUND OF THE INVENTION

1. Field of the Invention

The invention relates to a relay structure and associated circuit for use in a telephone communication system, wherein interruptions in transmission line loop current corresponding to dialing signals, for example, are evaluated by an evaluation device, which must therefore be unresponsive to alternating current signals present in the transmission line. The evaluation device is connected to a source of direct current potential and applies the direct current potential to the transmission line while simultaneously blocking alternating current signals.

2. Description of the Prior Art

Prior art telephone circuits provide evaluation apparatus for the evaluation of transmission line loop current interruptions indicative of dialed information. The evaluation apparatus normally employs relays, that are connected to the transmission lines through a transmission bridge, repeater-coil cord, or retardation-coil cord, that feeds a direct current signal to the transmission lines.

In voice telephone communication, alternating current signals corresponding to voice information are superposed on a direct current. Therefore, it is necessary that the evaluation apparatus serving to evaluate transmission line loop current interruptions additionally function to block the alternating current signals comprising voice telephone information. This is particularly essential when relatively newer type compact relays are employed, since these normally have low input resistance and therefore do not appreciably block the alternating current signals. Therefore, some prior art devices additionally employ a choke coil connectable between the evaluation apparatus and the transmission lines to block alternating current signals and pass direct current signals. However, the choke coil also provides increased resistance to direct current signals, and therefore the response reliability of circuits employing the described choke coil is decreased, and is dependent on the particular line conditions existing.

Thus, the relative strength of the direct current signal is considerably weakened, and consequently, the direct current signal amplitude must be increased to ensure correct evaluation of transmission line loop current interruptions by the relays. Alternatively, the relay must be constructed to provide greater response sensitivity, to counterbalance its decreased response reliability and this increases its cost.

Other disadvantages associated with the utilization of a choke coil are that its power consumption reduces the overall efficiency of the circuit, and thereby increases operational costs, and that it necessitates larger space requirements for the evaluation apparatus.

Other prior art devices utilize a choke coil, but connect the series connection of the relay winding of the evaluation apparatus and the choke coil indirectly to the transmission line. For example, if two transmission lines are connected by a transmission bridge, one end of which consecutively comprises the series connection of a first coupling winding, a capacitor, and a second coupling winding connected between the two transmission lines, a first relay winding of the evaluation means may be connected in series with a first choke coil between one terminal of a direct current source of potential and the common connection of the first coupling winding and the capacitor. Further, a second relay winding may be connected in series with a second choke coil between the other terminal of the direct current source of potential and the common connection of the capacitor and the second coupling winding. The capacitor prevents cross coupling of direct current signals between the two transmission lines and further may shunt undesired signals in the transmission bridge to ground. However, the transmission bridge in this prior art circuit is premagnetized by the direct current signals present in the series connections comprising the first and second relays, and therefore the transmission bridge, and more particularly its core, must be structurally designed to counter this premagnetization. Normally, this entails the construction of a relatively large core which is not only expensive, but also space consuming. Further, if core materials of high magnetic permeability are employed in order to minimize core size, the quality of the frequency response characteristics of the transmission bridge is decreased.

The described prior art transmission bridge presents other disadvantages because of transmission line inherent capacitance, which, in conjunction with actual capacitors connected therein, may cause imbalance conditions that may erroneously effect the evaluation device. Therefore, some prior art circuits provide for the inclusion of rectifiers in the series connection comprising the relays of the evaluation device to prevent alternating current signals from being applied thereto. While this may prevent erroneous response of the evaluation device, and more particularly, the tendency of its relays to vibrate in response to imbalance conditions, it substantially increases the cost of the equipment, and complicates its operation.

SUMMARY OF THE INVENTION

These and other defects of prior art relay circuits and structures are solved by the present invention, in which a transmission bridge comprises supplementary windings oppositely polarized with respect to the coupling windings that couple the transmission lines to the bridge, to cancel premagnetization of the transmission bridge core. The supplementary windings are connected in series with the evaluation means which comprise a particular relay structure and the source of direct current potential that is applied to the transmission lines.

The evaluation means evaluate transmission line loop current interruptions, that may be indicative of dialing or of other information. However, the evaluation means, and more particularly, the relay structure associated therewith, is not responsive to alternating current signals present in the transmission lines. Thus, the relay structure comprises an energization winding that presents a relatively high impedance to alternating current signals and therefore functions as a choke coil to block alternating current signals from the direct current source of potential, and also prevents actuation of the associated relay contacts by said alternating current signals. The relay structure is particularly designed to emphasize the choke effect of its energization winding to block alternating current signals that may be applied thereto, while maximizing its response to direct current signals indicative of transmission line loop current interruptions. That is, conventional choke coils, although blocking current signals also provide increased resistance to direct current signals, and attenuate the latter, sometimes to an appreciable degree. However, the relay structure disclosed herein maximizes the effect of direct current signals applied to its energization winding to ensure relay contact response thereto, and simultaneously blocks alternating current signals.

DETAILED DESCRIPTION OF THE INVENTION

Figure 1:
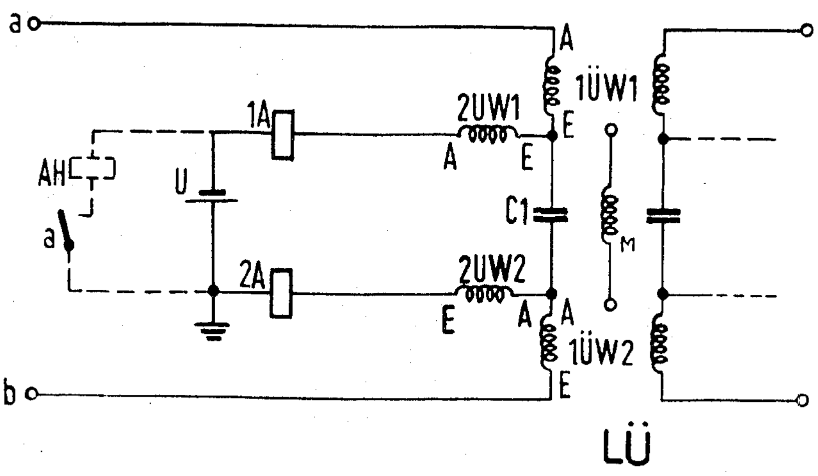
FIG. 1 is an electrical schematic diagram of a relay circuit according to the invention.

FIG. 1 shows an electrical schematic diagram of the relay circuit according to the invention. One end of transmission bridge LU is connected to transmission lines *a* and *b*. Direct current is applied to transmission lines *a* and *b* by direct current potential source U. Coupling windings 1UW1 and 1UW2 connect transmission lines *a* and *b* to the direct current potential source U, and inductively couples alternating current signals between the other end of the transmission bridge and transmission lines *a* and *b*. Thus, end A of coupling winding 1UW1 is connected to transmission line *a*, and end E' of coupling winding 1UW2 is connected to transmission line *b*. End E of coupling winding 1UW1 is connected to end E of supplementary winding 2UW1, and end A' is connected to end A' of supplementary winding 2UW2. Winding *m* is an impedance matching winding.

End A of supplementary winding 2UW1 is connected to one end of relay winding 1A, the other end thereof being connected to the negative terminal of direct current source U. Further, end E' of supplementary winding 2UW2 is connected to one end of relay winding 2A, the other end thereof being connected to the negative terminal of direct current potential source U, which is grounded. Direct current potential source U is shown as comprising a battery, but it is apparent that any source of direct current potential may be employed.

Supplementary winding 2UW1 is polarized oppositely with respect to coupling winding 1UW1, and supplementary winding 2UW2 is polarized oppositely with respect to coupling winding 1UW2. The coupling windings and the supplementary windings are wound on the transmission bridge core (not shown), and the supplementary windings are polarized as described to cancel any magnetic field produced by premagnetization of the transmission bridge core. Only direct current signals are applied to the supplementary windings, because, as described hereinafter, relays 1A and 2A effectively block alternating current signals.

The number of turns associated with each supplementary winding is substantially equal to the number of turns associated with its corresponding coupling winding. Further, the opposite polarity magnetic fields produced by the associated series connected supplementary and coupling windings (2UW1 and 1UW1; and 2UW2 and 1UW2), may be provided by oppositely winding the associated series connected windings. Thus, supplementary winding 2UW1 and coupling winding 1UW1 may be wound oppositely with respect to their series connection to produce equal and opposite magnetic fields to cancel the effect of direct current excitation of the coupling windings.

Relay energization windings 1A and 2A comprise evaluation means to indicate interruptions in transmission line loop current. The input resistance of the relay windings is relatively low to direct current signals. However, the energization windings effectively function as choke coils to block alternating current signals. The direct current source of potential U is applied to transmission lines *a* and *b*, and any direct current signals existing in either transmission line *a* or *b*, is decoupled from the other transmission line by decoupling capacitor C1.

Figure 2:
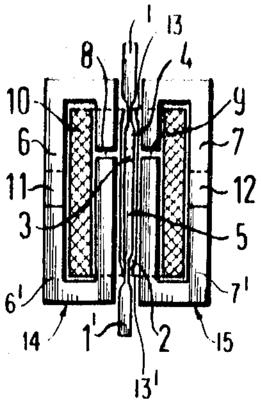
FIG. 2 is a partly cross-sectional view of a relay structure employed in the circuit shown in FIG. 1 according to the invention.

Relays 1A and 2A comprise the structure illustrated in FIG. 2, which is a partly cross-sectional view of a substantially annular compact relay structure having complimentary contacts 4 and 5 that may be selectively actuated to effect connection therebetween. Thus, contacts 4 and 5 overlap to some extent, and comprise relatively thin strips or laminates of electrically conductive material positioned within air gap 3, and hermetically sealed in chamber 2 from the atmosphere by end plates 13 and 13'. Conventional fused glass techniques may be employed to effect the hermetic seal and it is seen with reference to FIG. 2 that the outside ends 1 and 1' of contacts 4 and 5, respectively, extend through the hermetic seal.

The energization circuit of the choke-type relay illustrated, comprises iron core means that may be substantially annular in shape. Thus, core sections 14 and 15 are illustrated in FIG. 2, each comprising first and second portions. For example, core section 14 includes portions 6 and 6', each of which comprises a plurality of electrically insulated laminates, alternate ends of the laminates of portions 6 and 6' extending into predetermined area 11. Thus, successive laminates of portion 6 receive successive laminates of portion 6'. Similarly, core section 15 comprises core portions 7 and 77', each comprising a plurality of laminates alternate ends of which extend into predetermined area 12. Core sections 14 and 15, may preferably comprise an integral annular core. The inside legs of core sections 14 and 15 define air gaps 8 and 9, respectively, and energization winding 10 is wound around the inside legs of core sections 14 and 15 and encloses hermetically sealed complimentary contacts 4 and 5.

The separate laminate sections comprising the relay core may comprise ferrite sheet metal material. The individual portions 6 and 6' of core section 14, and 7 and 7' of core section 15, may be easily separated, and this facilitates insertion of winding 10 in the space defined between the inside and outside legs of the core sections.

The relay illustrated in FIG. 2 functions in the following manner. Assume that contacts 4 and 5 are separated, and that the relay is therefore in the rest position. If winding 10 is energized by a direct current signal, it will produce an electromagnetic field between core sections 14 and 15 in air gap 3 that will magnetize complimentary contacts 4 and 5 in opposite polarities and actuate said contacts to the closed position. Air gaps 8 and 9 defined by core sections 14 and 15, respectively, function to prevent a short circuit path for the magnetic flux produced by the electromagnetic field through the iron core sections, and thereby serves to produce an electromagnetic field in air gap 3 which magnetizes complimentary contacts 4 and 5 and actuates them to the closed position.

Alternating current signals are blocked from the circuits comprising energization winding 10 (relay windings 1A and 2A of FIG. 1) because said winding functions as a choke coil and therefore passes only direct current signals. Therefore, relays 1A and 2A function as evaluation means to evaluate and determine transmission line loop interruptions, and are not responsive to alternating current signals present in the transmission lines.

The relay structure illustrated in FIG. 2 may be varied to include a plurality of pairs of complimentary contacts 4 and 5, each having its own core, or alternatively, a common iron core may be employed for a plurality of pairs of complimentary contacts. Further, the relay illustrated in FIG. 2 may be provided with a plurality of magnetization windings, to selectively effect desired connections.

FIG. 1 also illustrates additional relay means AH connected between the positive and negative terminals of direct current potential source U, which may be utilized to further evaluate applied signals, and to effect successive connections (not shown) in response to evaluation of applied signal by relays 1A and 2A, and their associated contact *a*.

The relay structure described herein therefore comprises a laminated core defining an air gap, and having a given cross-sectional area, said air gap and/or area being dimensioned so that, in conjunction with the number of turns associated with the relay energization winding, an inductance is produced that blocks alternating current signals in the voice telephone communication range, and therefore eliminates the need for individual choke coils, and passes direct current signals with little attenuation. This substantially increases the efficiency of the described circuit, and maximizes the amplitude of the direct current energization signals applied to the energization winding.

Therefore, relative to prior art circuits, the amplitude of the energization signals may be reduced, or, alternatively, the response reliability of the relay may be increased. Further, the described annular construction of the relay core and air gap defined thereby, maximizes relay response to transmission line loop current interruptions. The supplementary windings described function to cancel any premagnetization flux in the core of the transmission bridge resulting from the direct current source U connection thereto, because the source of direct current signals U applied to the supplementary windings produces equal and opposite polarity magnitude fields relative to the magnetic fields produced by the coupling windings. Thus, even if a high amplitude loop current is present, a relatively small sized transmission bridge may be employed (corresponding to a small core size), because the transmission bridge core will not be saturated by premagnetization thereof. Thus, a high transmission loop current and a relatively small transmission bridge may be simultaneously employed, which the advantageous result that construction costs and transmission bridge size are minimized. Further, any inductive and capacitive effects that might cause relay contact vibration and therefore inaccurate indication of transmission line loop current interruption is reduced by the supplementary windings, which suppress signals resulting from said inductive or capacitive effects. Therefore, the need for rectifiers as described in relation to prior art relay circuits is eliminated.

The invention provides a relay circuit which is less sensitive to disturbance voltages, and which has a better response reliability to transmission line loop current interruptions, without requiring the use of additional components. Therefore, the manufacturing cost of the circuit is substantially reduced, its size is minimized, and its operation reliability is optimized, relative to prior art circuits.

I claim:

1. In a communication system having a transmission bridge (LU) that inductively couples first (*a* ) and second (*b* ) transmission lines to associated apparatus, an evaluation device to distinguish interruptions in direct current signals from alternating current signals present in the first (*a* ) and second (*b* ) transmission lines comprising:

a direct current source of potential having first and second oppositely polarized output terminals;

the series connection of a first coupling transformer winding (1UW1), a first supplementary transformer winding (2UW1) and first relay means (1A) connected between the first transmission line (*a* ) and the first output terminal, the first coupling transformer winding (1UW1) and the first supplementary transformer winding (2UW1) being wound to produce oppositely polarized electromagnetic fields;

the series connection of a second coupling transformer winding (1UW2), a second supplementary transformer winding (2UW2) and second relay means (2A) connected between the second transmission line (*b* ) and the second output terminal, the second coupling transformer winding (1UW2) and the second supplementary transformer winding (2UW2) being wound to produce oppositely polarized electromagnetic fields;

capacitive means (C1) connected between the series connection of the first coupling transformer winding (1UW1) and the first supplementary transformer winding (2UW1), and the series connection of the second coupling transformer winding (UW2) and the second supplementary transformer winding (2UW2), the first and second relay means each having an energization winding (10) that blocks alternating current signals, and responsive to interruptions in direct current signals in the first and second transmission lines to actuate associated contact means (*a* ) to effect evaluation thereof;

and wherein said first and second relay means each comprises an annular magnetic core (14, 15) having interior and exterior walls that define a space therebetween; the interior wall having first and second spaced sections that define an air gap (8) therebetween, and defining a central opening in the annular magnetic core;

an energization (10) winding wound around the interior wall positioned in the space defined between the interior and exterior walls connected between the associated output terminal and supplementary transformer winding; and complimentary first and second contact means (4, 5) supportably positioned in the central opening having overlapping portions (6) substantially adjacent to the aid gap (8), selectively actuable in response to energization of the energization winding to effect connection of the overlapping portions.

2. The communication system recited in claim 1 wherein the annular magnetic core (15, 15) comprises upper (6) and lower (7) portions each having a plurality of electrically insulated metallic laminates, end sections of consecutive upper and lower section laminates partially overlapping (11).